UNITED STATES PATENT OFFICE.

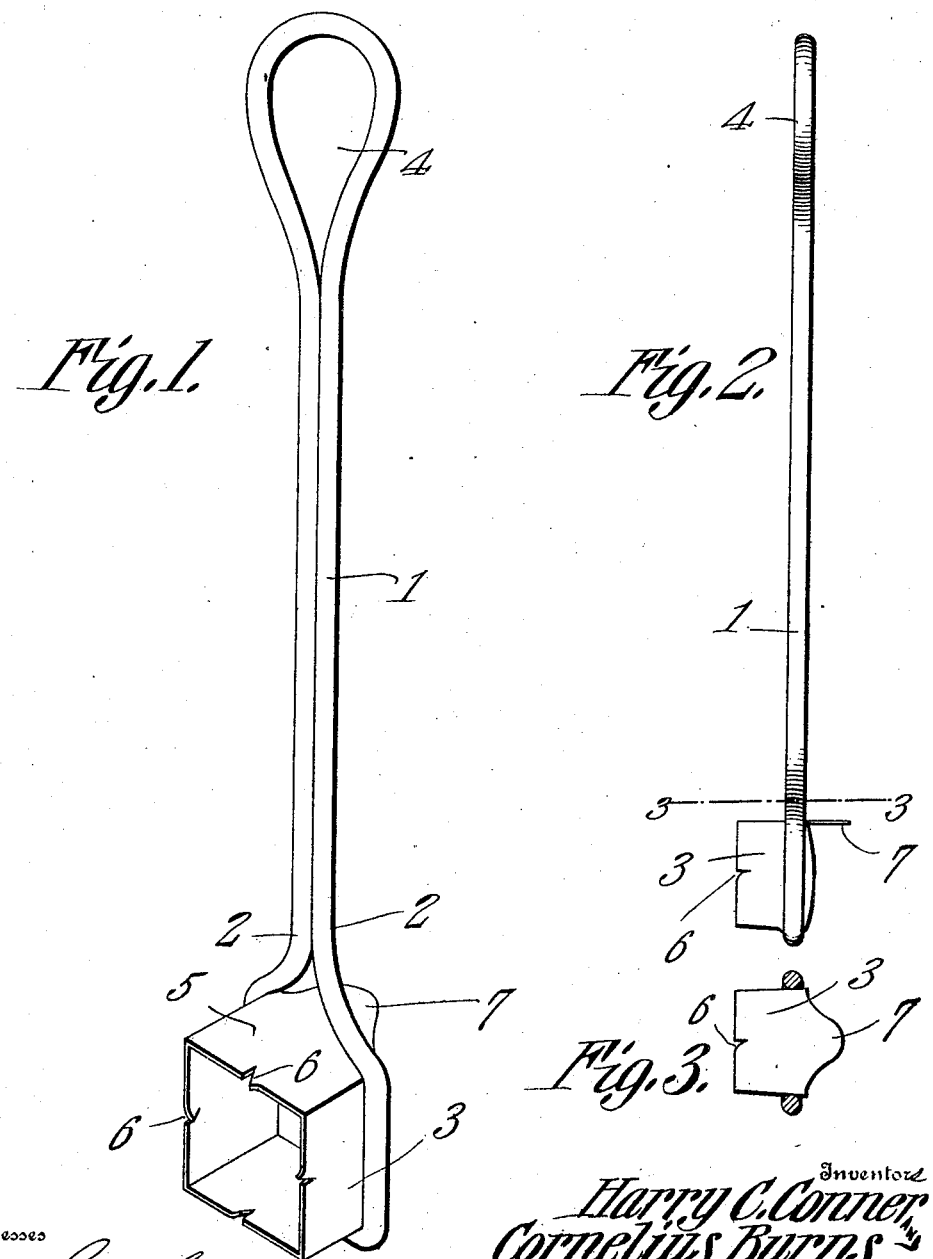

HARRY C. CONNER AND CORNELIUS BURNS, OF BURNSIDE, PENNSYLVANIA.

POTATO-EYE CUTTER.

967,882.  Specification of Letters Patent.  Patented Aug. 23, 1910.

Application filed July 27, 1909. Serial No. 509,947.

*To all whom it may concern:*

Be it known that we, HARRY C. CONNER and CORNELIUS BURNS, citizens of the United States, residing at Burnside, in the county of Clearfield, State of Pennsylvania, have invented new and useful Potato-Eye Cutters, of which the following is a specification.

Our invention relates to potato eye cutters and has for an object to provide a simple and inexpensive device that can be conveniently manipulated to section seed potatoes in such a manner that a minimum amount of waste will occur during the operation.

It further contemplates the construction of a device of this type and character which will cut a square section from the body of the potato so that the eyes or sprouts will be of uniform size.

With the above and other objects in view this invention consists in the construction, combination and arrangement of parts all as hereinafter fully described, specifically claimed, and illustrated in the accompanying drawings wherein,—

Figure 1 is a perspective view of a cutter constructed after our improved invention. Fig. 2 is a side elevation of the same. Fig. 3 is a section taken along the line 3—3 of Fig. 2.

Reference being had to the drawings, 1 indicates in general the handle of our device which is formed of wire bent in such a manner that at one extremity there is formed between the strands 2 thereof, a rectangular orifice 3 and at the opposite extremity an opening 4 so situated that the same may form a convenient grip for the hand.

Disposed within the rectangular orifice 3 is a cutting member 5 substantially rectangular in contour and cross section and formed preferably from thin sheet metal. The side and end walls of the cutting member are inclined outwardly so that the cutter may be tightly wedged in the rectangular orifice 3.

This cutter has formed in its cutting edge a plurality of inwardly bent cutting teeth 6, which perform the double function of cutting devices when the cutter is being operated and retaining members when the cutter is drawn from the potato.

To facilitate the operation of this device an outwardly curved lug 7 is carried on the side of the rectangularly formed cutting member 5 adjacent the handle in such a manner that when in operation the finger of the operator may be brought to bear against the same, and as a result promote the cutting powers thereof and provide an additional brace for retaining the cutter in the handle portion.

From the foregoing it will be readily understood that the operation of this device is as follows;—The rectangular cutting member 5 is placed over the eye in such a manner that the teeth 6 are brought into engagement therewith, and is pressed into the potato to any required depth after which a partial turn is applied thereto causing the teeth to sever the eye from the potato and retaining the same in the interior of the cutter. The cutter is then withdrawn from the potato carrying the severed eye with it. The eyes or sprouts are thus removed from the potato with but very little waste and further may be regulated in size by simply driving the cutter to a depth that will remove a section of the desired size, it being evident that the depth alone of the sprouts will vary as the area inclosed by the walls of the cutter limits the cross sectional area of the sprouts. The particular advantage in having the sprouts of uniform cross sectional area is that it is possible to drop sprouts so formed by machinery whereby to minimize the manual labor incident to planting.

From the foregoing description, taken in connection with the accompanying drawing it is thought that the construction and operation of our invention will be easily understood without a more extended explanation, it being understood that various changes in the form, proportion, and minor details of construction may be made without sacrificing any of the advantages or departing from the spirit of the invention.

Having thus described our invention what we claim as new and desire to protect by U. S. Letters Patent is;—

1. A device of the class described comprising a bent wire handle having an orifice at one extremity, a rectangularly formed cutting member adapted to be received in said orifice, inwardly formed teeth on the lower edge of said cutting member, and a stop carried by said cutter against which the hand of the operator may be brought to bear in applying pressure to said cutter.

2. A device of the class described comprising a handle having an orifice in one extremity, and a detachable rectangularly formed cutting member in said orifice having a lug projecting from one of its walls adjacent the handle portion.

3. In a device of the class described, the combination with a bent wire handle portion having a rectangular orifice at one end, of a cutting member disposed in said rectangular orifice and having a series of inwardly formed teeth about its lower edge, and a lug projecting from said cutter adjacent said handle.

4. In a device of the class described, the combination with a handle portion having a rectangular orifice formed at one extremity, of a tapering rectangularly formed cutting member disposed therein, inwardly formed teeth on the lower edge of said cutting member, and a lug projecting from said cutter adjacent the handle portion and oppositely disposed thereto, against which the operator's hand may bear to facilitate the operation of said cutter.

In testimony that we claim the foregoing as our own, we have hereto affixed our signatures in the presence of two witnesses.

HARRY C. CONNER.
CORNELIUS BURNS.

Witnesses:
 IVA V. HOUSTON,
 S. M. HOUSTON.